United States Patent [19]

Eustache

[11] Patent Number: 4,970,752
[45] Date of Patent: Nov. 20, 1990

[54] FOLDING WINDSHIELD WIPER INSTALLATION

[75] Inventor: Jean-Pierre Eustache, Anthony, France

[73] Assignee: Valeo Systemes D'Essuyage, Montigny Le Bretoneux, France

[21] Appl. No.: 505,664

[22] Filed: Apr. 3, 1990

[30] Foreign Application Priority Data

Apr. 14, 1989 [FR] France ................ 89 04984

[51] Int. Cl.$^5$ .................. B60S 1/02; B60S 1/26; B60S 1/36
[52] U.S. Cl. ............... 15/250.35; 15/250.16; 15/250.19
[58] Field of Search .......... 15/250.16, 250.17, 250.18, 15/250.19, 250.21, 250.35

[56] References Cited

U.S. PATENT DOCUMENTS 4,780,926 11/1988 Kondo et al. ............. 15/250.21
4,783,876 11/1988 Souma et al. ............. 15/250.17

FOREIGN PATENT DOCUMENTS 0235434 9/1987 European Pat. Off. .

Primary Examiner—Harvey C. Hornsby
Assistant Examiner—G. Graham
Attorney, Agent, or Firm—Dennison, Meserole, Pollack & Scheiner

[57] ABSTRACT

The present invention is concerned with retractable windshield wiper installations for vehicle, having a foldable wiper arm.

The installation according to the invention includes a wiper arm comprising a blade carrier and a support arm, in which the blade carrier is moveable between a deployed position and a position in which it is folded back against the support arm. The wiper arm is driven in rotation by a drive spindle mounted on a support plate. A deployment mechanism is actuated by a deployment motor so as to move the blade carrier from its folded back position to its deployed position and vice versa. The deployment motor is fixed on the support plate so that it is not driven in rotation by the drive spindle. In this way, the inertia of the assembly which is driven in rotation during the wiping operation is very much reduced by comparison with installations in which the deployment motor is carried by the blade carrier support arm.

10 Claims, 3 Drawing Sheets

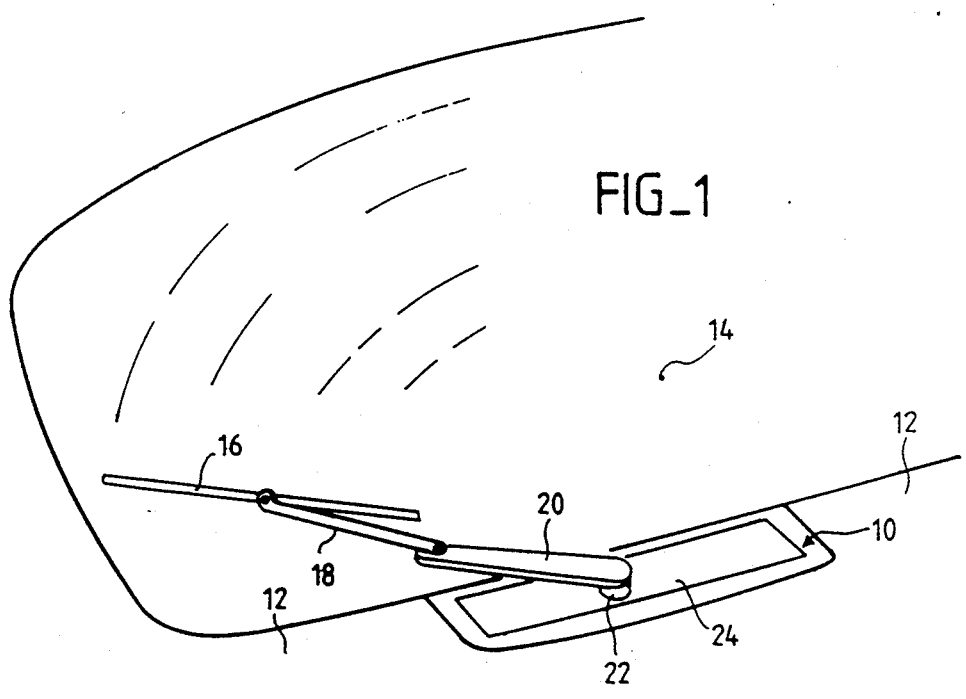
FIG_1
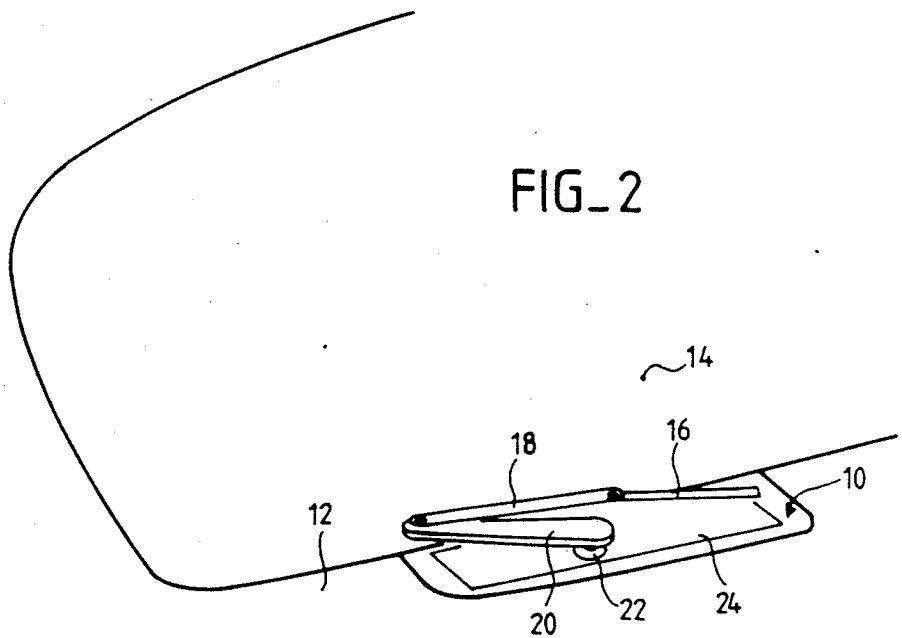
FIG_2

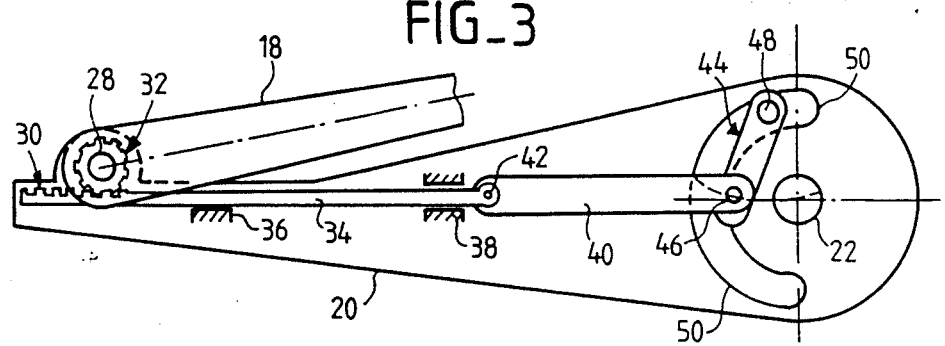
FIG_3
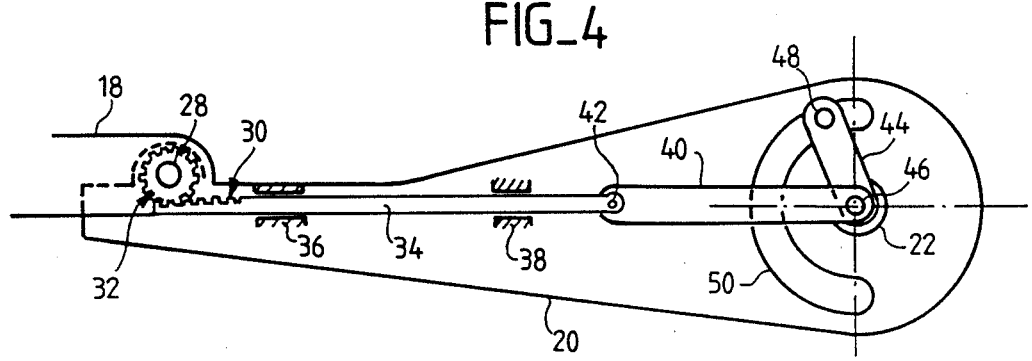
FIG_4
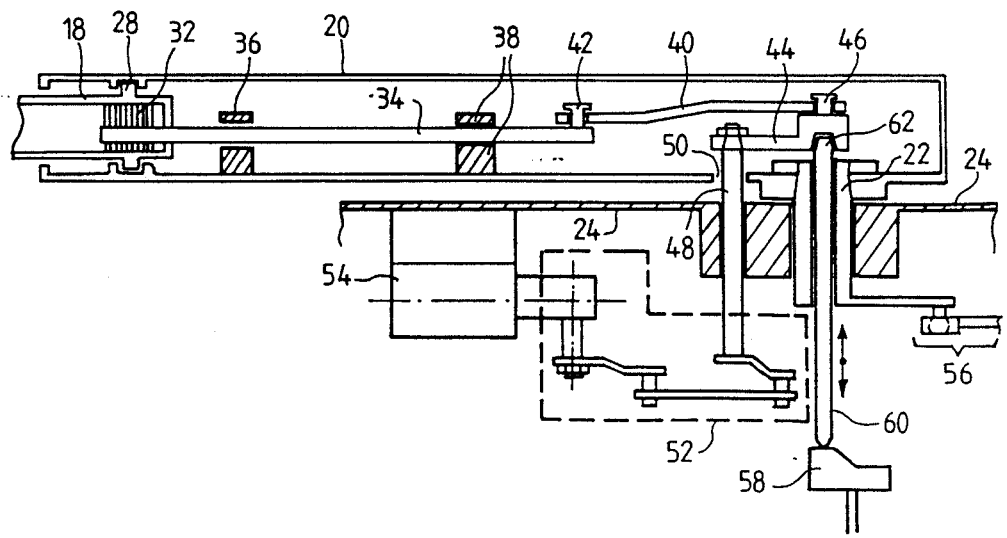
FIG_5

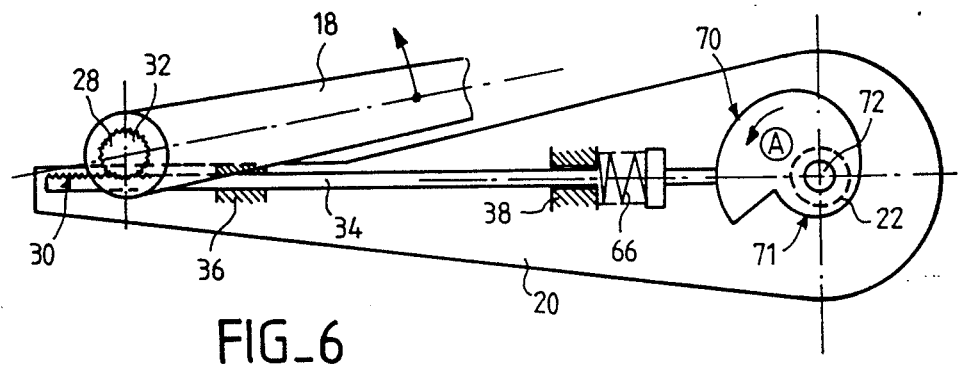
FIG_6
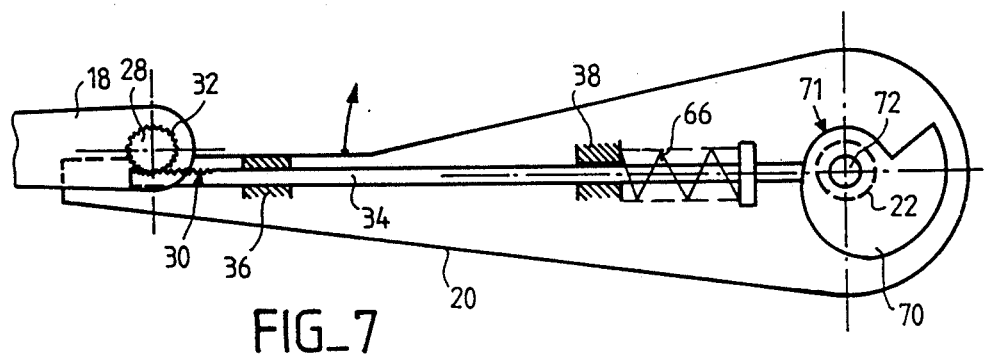
FIG_7
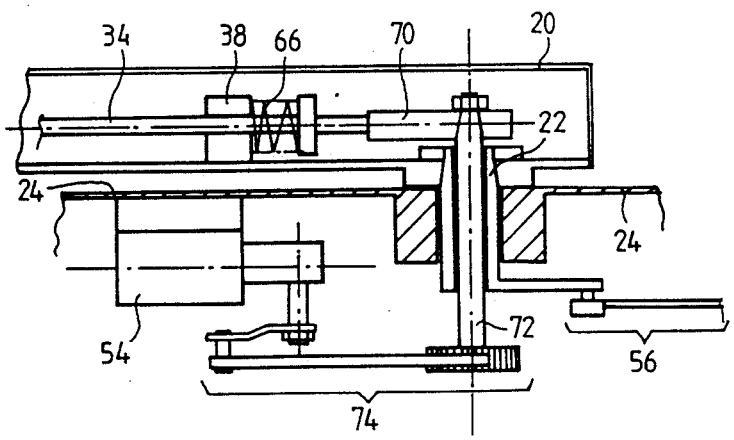
FIG_8

FOLDING WINDSHIELD WIPER INSTALLATION

FIELD OF THE INVENTION

The present invention relates to windshield wiper installations for vehicles, in which the windshield wiper is retractable and includes a blade carrier which can be folded back prior to retraction after use, the installation including a mechanism for folding the blade carrier back and for deploying it ready for use. The field of the invention also, however, extends to other contexts in which there is a need for one member to be folded back against another.

BACKGROUND OF THE INVENTION

Vehicles can be equipped with retractable windshield wiper installations such that the windshield wiper mechanism itself is parked inside a closed housing below the hood of the vehicle when not in use for windshield wiping purposes. When it is required for use, a deployment mechanism, operated by a motor, is activated so as to raise the windshield wiper out of the housing and to put the various components of the system into appropriate positions for wiping the windshield of the vehicle.

In designing such a system, it is in particular necessary to resolve the problem of folding up the wiper arm that supports the wiper blade, ready to be parked in the housing. The wiper blade is carried by a blade carrier which is pivoted to a blade carrier support arm, and the length of the wiper arm, that is to say the support arm and the blade carrier combined, is too large for it to be easily parked without the blade carrier having first been folded back against the support arm.

Hitherto, systems have been proposed in which the blade carrier, pivoted to the end of the blade carrier support arm, can be either folded back along the support arm or else deployed within the length of the support arm. A deployment motor, which is disposed on the blade carrier support arm and which is activated when deployment or folding back is required, enables the blade carrier to be moved from its folded back position to its deployed position and vice versa. When the windshield of the vehicle is to be wiped by the blade, the blade carrier is in the deployed position and a wiper motor drives the assembly of the support arm and blade carrier in oscillating movement, first in one direction and then in the other.

Thus, the wiper motor has to drive in rotational movement an assembly the inertia of which is substantially greater than with conventional, non-retractable, windshield wipers, due to the numerous additional members necessitated by the mechanism for deployment and folding back. But as in any oscillating system, in which it is necessary periodically to reverse the direction of rotation of the assembly, the inertia of the assembly to be driven is a most important factor to be taken into account.

DISCUSSION OF THE INVENTION

An object of the present invention is to provide a means for deployment and folding which has a smaller inertia than systems hitherto proposed, in such a way as not to load the wiper motor to excess, or in such a way to avoid the necessity for this motor to be unnecessarily large.

A further object of the invention is to provide a means for deployment and folding back which will be relatively simple, not too costly, and reliable.

In accordance with the invention, a windshield wiper installation of the kind having a folding wiper arm, comprising a wiper blade carried by a blade carrier which is pivoted on a blade carrier support arm that is driven in rotation by a drive spindle mounted in a support plate, with a deployment mechanism actuated by a deployment motor so as to cause the blade carrier to be moved from a folded position to a deployed position and vice versa, is characterised in that the deployment motor is fixed on the support plate so that it is not caused to rotate by the drive spindle.

More precisely, the windshield wiper installation in accordance with the invention preferably comprises:

the support plate, with the drive spindle rotatably mounted thereon, the drive spindle being coupled to a wiper motor;

the blade carrier support arm, secured to the drive spindle for rotation therewith;

the blade carrier, pivoted to one end of the arm and being displaceable by the action of the deployment motor between the said folded position and deployed position; and a deployment mechanism actuated by the deployment motor for causing the blade carrier to move form its folded back position to its deployed position and vice versa, the deployment motor being fixed on the support plate so that it is not moved with the wiper when the latter is rotated back and forth by the wiper motor.

Preferably, the deployment mechanism comprises a first part which is coupled to the deployment motor; a second part which is rotatable with the arm when the latter is driven by the wiper motor; and coupling means between the said first and second parts, the coupling means being adapted to cause the said second part to move from a first configuration corresponding to the folded position of the blade carrier to a second configuration corresponding to the deployed position of the blade carrier, and vice versa.

In a first embodiment of the invention, the said coupling means include a freely rotatable pivot on which a link is mounted for free rotation, this link being part of the said second part of the mechanism, and this pivot is displaceable between two positions under the action of the deployment motor. In a first of these positions, the axis of the pivot is parallel to that of the drive spindle for the blade carrier support arm, but is offset laterally with respect to the drive spindle axis. In the second position, the pivot axis is coincident with the axis of the drive spindle. During displacement of the pivot, the link is pulled or pushed by the pivot, and this movement of the link causes the blade carrier to be deployed or folded back. In its second position, the link, driven in rotation by the wiping movement of the support arm, rotates freely about the pivot.

In another embodiment, the constitution of the coupling means between the said first and second parts of the deployment mechanism involves a cam which itself forms part of the first part of the mechanism, together with a push rod which is displaceable under the action of the cam and which is itself part of the second part of the mechanism. The cam is actuated by the deployment motor between two positions, namely a first and a second cam position. While moving from the first to the second of these cam positions, the cam displaces the push rod, which thereby causes the blade carrier to be moved from its folded position to its deployed position. Movement of the cam from its second to its first position has the opposite effect. In the second cam position (corresponding to the deployed position of the blade carrier), the push rod, being driven in rotation by the movement of the support arm, rotates freely about a portion of the cam which is so profiled as not to impose any radial movement on the push rod during this rotation.

In this second embodiment, the push rod is biassed into engagement against the cam by means of the spring or any other suitable return means. Preferably, the cam is rotatably mounted about an axis which is coincident with that of the drive spindle for the support arm.

The link in the first embodiment, or the push rod in the second embodiment, preferably produce the deployment and folding back effects through a rack and pinion device comprising a rack which is fixed with respect to the push rod or the link (or fixed to a push rod which is actuated by the link), and a toothed wheel which is fixed to the blade carrier.

Further features and advantages of the invention will appear from a reading of the detailed description that follows, being given by way of example only and with reference to the accompanying drawings.

BRIEF DESCRIPTION OF THE DRAWINGS

FIG. 1 is a general view of a retractable windshield wiper installation with the wiper in the deployed position.

FIG. 2 is a view of the installation with the wiper in the folded position.

FIG. 3 is a diagrammatic view showing a first embodiment of the deployment mechanism in an installation in accordance with the invention, in the folded position of the wiper, viewed in the direction of the axis of the rotating wiping movement.

FIG. 4 is a view similar to FIG. 3, but in the deployed position of the wiper.

FIG. 5 is a cross sectional view looking downwards in relation to FIG. 4, the cross section being taken on a plane containing the axis of the rotating wiping movement.

FIG. 6 is a diagrammatic view similar to FIG. 3, but showing a second embodiment of the deployment mechanism in an installation in accordance with the invention, in the folded position of the wiper.

FIG. 7 is similar to FIG. 6 but shows the same embodiment in the deployed position of the wiper.

FIG. 8 is a cross sectional view of part of the mechanism shown in FIG. 7, as seen from above, the cross section being taken on a plane containing the axis of the rotating wiping movement.

DESCRIPTION OF PREFERRED EMBODIMENTS OF THE INVENTION

The general views seen in FIGS. 1 and 2 simply illustrate what a retractable windshield wiper system consists of. In FIG. 1, the windshield wiper is in a deployed position, while in FIG. 2 it is in a folded position.

Still with reference to FIGS. 1 and 2, the windshield wiper is retractable into a housing 10 formed in the hood 12 of the vehicle, in front of the windshield 12 that is to be swept. The wiper blade 16 is secured on a blade carrier 18 which is pivoted to one end of a blade carrier support arm 20, which is arranged to be driven in oscillating rotational movement by means of a drive spindle 22 which is preferably arranged at the other end of the arm 20. The spindle 22 is mounted in a support plate 24. This plate is the main support element of the whole installation. In particular, it carries the wiper motor (not shown) that drives the spindle 22 in rotation. Preferably, the plate 24 is lowered into the interior of the housing 10 when the installation is retracted. It is raised, and remains in its raised position, when the windshield wiper is to be operated.

In the deployed position, the blade carrier 18 is essentially oriented as a linear extension of the arm 20, as seen in FIG. 1, so as to constitute the wiper arm itself, carrying the blade 16. In the folded position, for retraction of the wiper, the blade carrier 18 is folded along the arm 20 so that the arm and the blade carrier together form a more compact assembly and are able to enter into the housing 10.

The wiper carrier 18 is only displaced with respect to the arm 20 in order to pass from the folded position to the extended position and vice versa. However, while the wiper is moving across the windshield during a wiping operation, the blade carrier 18 is effectively fixed to the arm 20 for rotational movement with it, so that together they form a substantially rigid wiper arm assembly which ensures that the wiper blade will be driven across the windshield.

Movement of the blade carrier from its folded position to its deployed position and vice versa is obtained by means of an electric motor which may be called the deployment motor, not shown in FIGS. 1 and 2. This deployment motor must, accordingly, govern the pivoting movement of the blade carrier 18 about an axis situated at one end of the arm 20. The forms of construction which have been proposed in the past, in order to carry out this operation, use a deployment motor which is fixed on the arm 20 itself; its inertia contributes to the overall inertia of the assembly of the support arm, blade carrier and wiper blade, thus rendering the task of the wiper motor more onerous.

In accordance with the invention, the deployment motor is fixed on the support plate 24 and not on the blade carrier support arm 20, so that it is not moved by the arm 20 during the windshield wiping operation carried out by the latter.

Referring now to FIGS. 3 to 6, these show a first embodiment of the invention. They are only diagrammatic, and illustrate only those parts of the deployment and retraction mechanism relevant to an understanding of the invention.

In FIG. 3, the blade carrier support arm 20 and the blade carrier 18 are shown with the former folded back along the arm 20. The arm 20 is fixed to the drive spindle 22 which is situated at one end of the arm; during the wiping movement, the spindle rotates and drives the arm. The blade carrier 18 is pivoted to the other end of the arm 20 about an axis of rotation 28. The coupling mechanism between the arm 20 and the blade carrier 18 comprises, by way of example, a rack 30 which forms part of the arm 20 itself and a toothed wheel 32, which forms part of the blade carrier 18, and with which the rack 30 cooperates.

The rack 30 is carried by a push rod 34, which is displaceable within the interior of the arm 20 only in linear movement in a direction which is generally along the arm 20. The push rod 34 is guided for this purpose by means of guides 36 and 38 which are fixed with respect to the arm 20, so that it is carried with the arm when the latter is driven in rotation.

FIG. 3 shows the push rod 34 in a position in which it is fully or nearly fully extended towards the outer end of the arm 20 to which the blade carrier 18 is connected; the latter is thereby fully or nearly fully folded along the arm. By contrast, FIG. 4 shows the push rod 34 drawn back to the maximum extent towards the other end of the arm 20, remote from the blade carrier 18. Movement of the push rod from its extended position, FIG. 3, to its withdrawn position, FIG. 4, causes the toothed wheel 32 to be rotated, thus rotating the blade carrier 18 about the axis 28 from its folded position to its deployed position.

It can also be seen from FIGS. 3 and 4 that the push rod 34 is connected to a link 40, with a freely rotatable pivot 42 between the push rod and the link 40. The link 40 is substantially aligned as an extension of the push rod 34, so that like the latter, it extends substantially in a direction generally along the arm 20. It serves to push or pull the push rod 34. However, it will be seen that the pulling and pushing movement imposed on the link 40 so as to act on the push rod 34 is not strictly a movement in the general direction along the arm 20, but has a transverse component, since it is a rotational movement. This is why the freely rotatable pivot 42 is provided between the push rod 34 and the link 40. In this way friction between the push rod 34 and the guides 36 and 38 is avoided.

The link 40, besides being pivoted at one of its ends to the push rod 34, is also pivoted at its other end to a further link 44, through a pivot 46. The pivot 46 between the two links is again a freely rotatable pivot, so that if one of the links performs a simple rotational movement about this pivot, it does not impose any movement on the other link. The other end of the link 44 is secured on a drive spindle 48 which is mounted for rotation on the support plate 24, and which extends through a hole 50 which is formed in the lower or rear wall of the arm 20, as can best be seen from FIG. 5.

The spindle 48, when in rotation, drives the link 44 in rotation in such a way that the pivot 46 is displaced between a first position (FIG. 3) in which it pushes the link 40, and therefore the push rod 34, fully towards the outer end of the arm 20 at which the wiper carrier 18 is mounted, and a second position (FIG. 4) in which it draws the link 40 and the push rod 34 back. In the second position, the axis of the freely rotatable pivot 46 coincides with the axis of the drive spindle 22 of the arm 20.

The hole 50 is in the form of a slot, shaped generally as an arc of a circle and centred on the axis of the drive spindle 22 in such a way that, when the arm 20 rotates during wiping, the spindle 48 (which lies in a fixed location with respect to the support plate 24 in the same way as the spindle 22) does not hinder the rotational movement of the arm 20.

In FIG. 5, the push rod 34, displaceable longitudinally and guided by the guides 36 and 38, is again shown together with the link 40 with its two freely rotatable pivots 42 and 46, and the link 44 which enables the push rod 34 to be withdrawn or extended and which, during pulling movement on the push rod, enables the pivot 46 to be drawn into a position in which its axis coincides with that of the shaft 22. As can at once be seen from FIGS. 3 to 5, the above mentioned elements are all contained within the arm 20, and it is in the lower or rear wall of this arm, immediately adjacent to the support plate 24, that the slot 50, through which the spindle 48 extends, is formed.

The drive spindle 48 which serves to cause the link 44 to rotate is driven in rotation by a deployment motor 54, which is fixed below the support plate 24 and which is coupled to the spindle 48 through a system of pivoted links and/or gears, belts, or indeed any suitable transmission means, generally indicated at 52.

The deployment, or articulation, mechanism in accordance with the invention thus essentially comprises two parts linked together through coupling means. The first part extends from the deployment motor 54 to the link 44, and comprises the transmission means 52, the spindle 48 and the link 44. The second part comprises the link 40, push rod 34, rack 30 and toothed wheel 32. In this example, the pivot 46 constitutes the coupling means between the two said parts. The axis of this pivot, freely rotatable as already mentioned, coincides with that of the spindle 22 when the blade carrier 18 is in the deployed position, so that rotation of the arm 20 then causes no displacement of the components of the second of the said parts.

Also shown in FIG. 5 is a system of further links 56 which are coupled with the wiper motor, not shown, itself for driving the spindle 22 in rotation. Again, FIG. 5 shows a cam 58 which is disposed below the spindle 22. This cam 58 is displaced (for example by being rotated by a further motor), in such a way as to push upwardly a second push rod 60 which extends axially upwards through the drive spindle 22. When raised in this way, the push rod 60 engages in a recess 62 which is formed in the link 44 directly below the freely rotatable pivot 46. Preferably, the upper end of the push rod 60 is conical in shape, as is the recess 62 in which it engages. This engagement of the push rod 60 in the recess 62 takes place after the components have finished moving into the deployed position. It serves to keep the pivot 46 centred with respect to the axis of the drive spindle 22 while the windshield wiper arm (comprising the blade carrier support arm 20 and the blade carrier 18) is in operation to wipe the windshield.

In the example of another embodiment which is shown in FIGS. 6 to 8, the deployment mechanism essentially comprises a cam and a push rod which is displaced under the action of the cam. Those elements which have the same function as corresponding elements in FIGS. 3 to 5 carry the same reference numerals in FIGS. 6 to 8.

As in the embodiment shown in FIGS. 3 to 5, the blade carrier support arm 20 is driven in rotation during the wiping operation by the drive shaft 22 which is carried by the support plate 24. The blade carrier 18 is again deployed and folded back by means of a rack and pinion arrangement 30, 32, the rack 30 being carried by the push rod 34 and cooperating with the toothed pinion 32 which is fixed to the blade carrier 18. The push rod 34 is again guided by guides 36 and 38 in a direction which is generally longitudinal of the arm 20.

However, in this second embodiment the push rod 34 is biassed by means of a spring 66, or other suitable biassing means, towards a cam 70 which is arranged to be driven in rotation by the deployment motor 54, the latter being again fastened, as in the earlier embodiment, under the support plate 24. The cam 70 is fixed to a rotatable drive spindle 72, which is preferably coaxial with the main drive spindle 22 and which passes through the latter. If the drive spindle 72 were to be offset laterally with respect to the axis of the spindle 22, it would be necessary to provide a slot of arcuate form like the slot 50 in the first embodiment, so that the spindle 72 would not hinder the rotational movement of the arm 20 during wiping. In the present embodiment, a transmission is provided that comprises links and a rack and pinion, between the deployment motor 54 and the drive spindle 72. The transmission in this form, which is indicated generally by the reference numeral 74, is given here by way of example only.

While the blade carrier 18 is in course of being folded back, the cam 70 operates to displace the push rod 34 generally longitudinally in the arm 20 against the action of the return spring 66, so as to shift it from its position closest to the drive shaft 22 to its position furthest away from the latter. During this movement, the push rod 34 causes the blade carrier 18 to swing from its deployed position into its folded back position. Conversely, during deployment of the wiper, the rotating cam 70 becomes progressively reduced in its effective radius and allows the push rod 34 to retract under the action of the return spring 66; the push rod thus brings the wiper arm into its deployed position.

Once the push rod 36 is fully retracted, two possibilities arise: the push rod 34 comes into abutment against the cam 70 in a zone 71 in which the working or camming surface of the cam is of constant radius coaxial with the main drive shaft 22; or alternatively, the effective radius of the camming surface of the cam is reduced during rotation of the latter until the push rod 34 merely comes into engagement on a fixed stop element (not shown) which is fixed to the arm 20 in such a way that the push rod is not in actual contact with the cam. In the former case, since the point of contact between the push rod and the cam follows a circular path centred on the axis of the main drive shaft 22, the push rod 34 is not displaced radially during the rotation of the arm 20 by the wiper motor, but simply follows this circular path. This is the situation shown in FIGS. 7 and 8. In the alternative case described above, and not shown, the push rod 34 again does not become radially displaced during rotation of the arm 20, since it is held in engagement against the fixed stop element through the action of its return spring 66, the part of the working surface of the cam facing the push rod at this time being spaced away from the push rod.

In the embodiment shown in FIGS. 6 to 8, the deployment mechanism can again be considered as divided into two parts, coupled together by coupling means. In this case, however, the first part, coupled to the deployment motor 54, comprises the cam 70, together with the drive system 74 and auxiliary drive spindle 72, while the second part comprises the push rod 34 and the toothed wheel 32. The coupling means in this case comprise the working surface of the cam 70 and the end of the push rod 34 which is engageable with the cam, together with the return spring 66 which tends to maintain the push rod in its rear or retracted position towards the working surface of the cam.

What is claimed is:

1. A windshield wiper installation comprising: a support plate; a drive spindle; means mounting the drive spindle rotatably in the support plate; a wiper blade comprising a blade carrier support arm fixed to the drive spindle for rotational movement therewith, a blade carrier, and pivot means mounting the blade carrier on the blade carrier support arm; a wiper blade carried by the blade carrier; a deployment motor fixed with respect to the support plate so as to be stationary when the blade carrier support arm rotates with the drive spindle; and a deployment mechanism comprising means for transmitting motion from the deployment motor to the pivot means coupling the blade carrier to the blade carrier support arm, whereby to move the blade carrier between a first position folded back against the support arm and a second position, in which it is deployed with respect to the support arm so that the wiper blade can perform a wiping operation.

2. A windshield wiper installation according to claim 1, wherein the blade carrier is mounted at one end of the support arm, and the deployment mechanism comprises a first part coupled directly to the deployment motor, a second part carried by the blade carrier support arm for movement therewith when the latter is rotated by the drive spindle, and coupling means coupling the said first and second parts of the deployment mechanism together, the said coupling means being adapted to cause the said second part to change between a first configuration in which the blade carrier is folded back against the blade carrier support arm and a second configuration in which it is deployed therefrom.

3. A windshield wiper installation according to claim 2, wherein the said second part of the deployment mechanism comprises a link and means operatively connecting the said link with the pivot means coupling the blade carrier to the blade carrier support arm, the said coupling means that couples the said first and second parts of the deployment means together comprising a freely rotatable pivot joining the said link with the said first part of the mechanism, the first part of the mechanism comprising means for displacing the said freely rotatable pivot between a first pivot position in which the pivot axis of the freely rotatable pivot is parallel with that of the drive spindle carrying the blade carrier support arm but offset laterally with respect to it, and a second position in which the said pivot axis is coincident with that of the said drive spindle, whereby displacement of the position of the said pivot axis between the said first and second positions causes the link to be displaced, whereby to cause the blade carrier to move between its deployed and folded back positions.

4. A windshield wiper installation according to claim 3, wherein the said second part of the mechanism includes a push rod and means mounting the push rod in the blade carrier support arm for linear movement of the push rod in a direction generally longitudinal of the support arm, and means including a second freely rotatable pivot and joining the push rod to the said link.

5. A windshield wiper installation according to claim 4, wherein the means for engaging the push rod with the cam comprises a return spring means.

6. A windshield wiper installation according to claim 4, wherein the pivot means coupling the blade carrier with the blade carrier support arm comprises a toothed wheel fixed to the blade carrier and a rack comprised in the push rod and cooperating with the toothed wheel.

7. A windshield wiper installation according to claim 2, wherein the said coupling means between the said first and second parts of the deployment mechanism comprise a cam and a push rod respectively, the said second part further including means in the blade carrier support arm, mounting the push rod for linear movement therein, and means coupling the push rod with the pivot means between the blade carrier support arm and the blade carrier, the said first part of the mechanism comprising means coupling the cam with the deployment motor for movement of the cam between a first position and a second position whereby to displace the push rod, and the said coupling means comprising means for engaging the push rod with the cam, whereby in the said first position of the cam the blade carrier is in its folded back position and in the second position of the cam the blade carrier is in its deployed position.

8. A windshield wiper installation according to claim 7, wherein the cam has a camming surface for operative engagement with the push rod, the said camming surface being so profiled that in the said second position of the cam, movement of the push rod by the cam is absent when the blade carrier support arm is moved in rotation by its drive spindle.

9. A windshield wiper installation according to claim 8, wherein the said camming surface includes a surface portion of constant radius for engagement by the push rod when the cam is in its second position and when the blade carrier support arm is rotated at the same time by its drive spindle.

10. A windshield wiper installation according to claim 5, wherein the first part of the deployment mechanism includes an auxiliary drive spindle coupled with the deployment motor for rotation thereby, the said cam being fixed on the auxiliary drive spindle, the latter being coaxial with the drive spindle secured to the blade carrier support arm.

* * * * *